United States Patent
Nagata

(10) Patent No.: US 9,222,536 B2
(45) Date of Patent: Dec. 29, 2015

(54) RUBBER COMPOSITION FOR RUBBER VIBRATION INSULATOR

(71) Applicant: BRIDGESTONE CORPORATION, Chuo-ku, Tokyo (JP)

(72) Inventor: Takeshi Nagata, Yokohama (JP)

(73) Assignee: BRIDGESTONE CORPORATION, Tokyo (JP)

(*) Notice: Subject to any disclaimer, the term of this patent is extended or adjusted under 35 U.S.C. 154(b) by 0 days.

(21) Appl. No.: 14/295,527

(22) Filed: Jun. 4, 2014

(65) Prior Publication Data

US 2014/0361475 A1    Dec. 11, 2014

(30) Foreign Application Priority Data

Jun. 7, 2013   (JP) ................................. 2013-120537

(51) Int. Cl.
| | |
|---|---|
| C08L 7/00 | (2006.01) |
| F16F 1/36 | (2006.01) |
| B60R 13/08 | (2006.01) |
| C08K 5/3415 | (2006.01) |
| C08L 91/06 | (2006.01) |

(52) U.S. Cl.
CPC ............ *F16F 1/3605* (2013.01); *B60R 13/0838* (2013.01); *B60R 13/0876* (2013.01); *C08K 5/3415* (2013.01); *C08L 7/00* (2013.01); *C08L 91/06* (2013.01)

(58) Field of Classification Search
CPC ............... C08L 7/00; C08L 9/00; C08L 9/04; C08L 9/08; C08L 91/06; C08K 5/3415; C08K 3/04; C08K 5/47; C08K 5/09; C08K 3/06; C08K 2003/2296
USPC ................... 525/194, 232, 235, 238; 267/141
See application file for complete search history.

(56) References Cited

U.S. PATENT DOCUMENTS

| | | | | |
|---|---|---|---|---|
| 7,015,272 | B2 * | 3/2006 | Sandstrom | 524/495 |
| 7,390,850 | B2 * | 6/2008 | Cook et al. | 525/191 |
| 2012/0309902 | A1 * | 12/2012 | Okabe et al. | 525/237 |

FOREIGN PATENT DOCUMENTS

| | | |
|---|---|---|
| JP | 3-258840 A | 11/1991 |
| JP | 2009-298880 A | 12/2009 |

* cited by examiner

*Primary Examiner* — Nathan M Nutter
(74) *Attorney, Agent, or Firm* — Sughrue Mion, PLLC

(57) ABSTRACT

A rubber composition gives rise to a rubber vibration insulator superior not only in heat resistance and low-temperature performance but also in fundamental properties and damping properties. The rubber composition for rubber vibration insulator comprising: a rubber component comprising high-cis-high-vinyl butadiene rubber containing 85 to 93% of cis-1,4 ,bonds and 5 to 13% of vinyl bonds, sulfur, and a bismaleimide compound, wherein the sulfur is included in an amount of up to 1 part by weight, per 100 parts by weight of the rubber component.

18 Claims, No Drawings

RUBBER COMPOSITION FOR RUBBER VIBRATION INSULATOR

CROSS-REFERENCE TO RELATED APPLICATION

This non-provisional application claims priority under 35, U.S.C. §119(a) on Patent Application No. 2013-120537, filed in Japan on Jun. 7, 2013,, the entire contents of which are hereby incorporated by reference.

TECHNICAL FIELD

The present invention relates to a rubber composition for rubber vibration insulator, which gives rise to a rubber vibration insulator superior not only in heat resistance and low-temperature performance but also in fundamental properties and damping properties.

BACKGROUND ART

It has been a common practice to improve the riding comfort of automobiles and other vehicles by attaching a variety of vibration insulators to the source of vibration and noise, thereby reducing vibration and noise entering the compartment. For example, rubber vibration insulators are used as constituents of the torsional damper and engine mount in the case where the engine is the major source of vibration and noise. The resulting effect is absorption of vibration (that originates from the running engine) and reduction of vibration and noise (that enters the compartment and diffuses into the surrounding environment).

The rubber vibration insulator as mentioned above needs such fundamental properties as strength to support heavy objects like engines and ability to absorb and suppress vibration. It also needs heat aging resistance when it is used in a hot environment such as engine room. There is another requirement for damping properties in a cold environment because automobiles distributed recently throughout the global market are often used under harsh conditions in very cold high-latitude regions.

A conventional way of improving damping properties while keeping the fundamental properties (such as tensile elongation and tensile strength) of rubber vibration insulators is by combination of natural rubber or isoprene rubber with butadiene rubber with a high content of cis-1,4, bonds (which is referred to as high-cis butadiene rubber hereinafter). However, the high-cis butadiene rubber is liable to crystallize and become hard in a cold environment, and consequently it does not fully exhibit its damping properties when the engine is started at an extremely low temperature. Although it is possible to avoid crystallization and prevent aggravation of low-temperature properties by using a butadiene rubber with a low content of cis-1,4, bonds and a high content of trans-1,4, bonds (which is referred to as low-cis butadiene rubber hereinafter), the resulting rubber vibration insulator is poor in damping properties and has a high dynamic-to-static modulus ratio.

On the other hand, rubber vibration insulators can be improved in heat resistance if its sulfur content is reduced. However, the reduction of sulfur content to such an extent as to achieve the desired heat resistance is liable to aggravate damping properties and low-temperature performance. A method for improving heat resistance by combining a small amount of sulfur with a bismaleimide compound has been proposed in JP-A H03-258840. Nevertheless, there still is a demand for further improvement as far as damping properties and low-temperature performance are concerned. The proposed method has a disadvantage that the bismaleimide compound deteriorates the fundamental properties if it is added in an excess amount.

There is also a method of improving (or reducing) the dynamic-to-static modulus ratio of the rubber vibration insulator by incorporating diene rubber with a butadiene polymer (containing cis-1,4, bonds in an amount no less than 98.0%) and carbon black of large particle diameter, as proposed in JP-A 2009-298880. However, there is a need for improvement because the low-temperature performance does not reach a demand level.

As mentioned above, the rubber vibration insulator has fundamental properties, damping properties, heat resistance, and low-temperature performance which are mutually contradictory, and it has been difficult to improve such properties altogether by compounding in a conventional way. Thus, there is a demand for a new method of tackling the above-mentioned problems.

SUMMARY OF INVENTION

The present invention was completed in view of the foregoing. It is an object of the present invention to provide a rubber composition for rubber vibration insulator, which gives rise to a rubber vibration insulator superior not only in heat resistance and low-temperature performance but also in fundamental properties and damping properties (characterized by a low dynamic-to-static modulus ratio).

In order to achieve the above-mentioned object, the present inventors conducted extensive researches, which led to the finding that a rubber composition specified below yields, upon vulcanization and curing, a rubber vibration insulator which is superior not only in heat resistance and low-temperature performance but also in fundamental properties and damping properties (characterized by a low dynamic-to-static modulus ratio). The rubber composition is composed of rubber component which is high-cis-high-vinyl butadiene rubber containing 85, to 93% of cis-1,4, bonds and 5, to 13% of vinyl bonds and a crosslinking agent which includes sulfur and bismaleimide. This finding is the basis of the present invention.

The present invention provides a rubber composition for rubber vibration insulator, which is specified below.

[1], A rubber composition for rubber vibration insulator comprising:
  a rubber component comprising high-cis-high-vinyl butadiene rubber containing 85, to 93% of cis-1,4, bonds and 5, to 13% of vinyl bonds,
  sulfur, and
  a bismaleimide compound,
  wherein the sulfur is included in an amount of up to 1, part by weight, per 100, parts by weight of the rubber component.

[2], The rubber composition for rubber vibration insulator of [1],, wherein the rubber component further comprises one or more species of diene rubber selected from the group consisting of natural rubber, isoprene rubber, styrene-butadiene rubber, chloroprene rubber, and acrylonitrile-butadiene rubber.

[3], The rubber composition for rubber vibration insulator of [2],, wherein the diene rubber is included in a proportion of at least 50, parts by weight in 100, parts by weight of the rubber component.

[4], The rubber composition for rubber vibration insulator of [3],, wherein the diene rubber is included in the proportion of from 60, to 90, parts by weight, and the high-cis-highvinyl butadiene rubber is included in the proportion of from 10, to 40, parts by weight in 100, parts by weight of the rubber component.

[5], The rubber composition for rubber vibration insulator of [1],, wherein the sulfur is included in the amount of from 0.4, to 1, part by weight, per 100, parts by weight of the rubber component.

[6], The rubber composition for rubber vibration insulator of [1],, wherein the bismaleimide is included in the amount of from 1, to 5, parts by weight, per 100, parts by weight of the rubber component.

[7], The rubber composition for rubber vibration insulator of [2],, wherein the diene rubber is selected from the group consisting of natural rubber and isoprene rubber.

[8], The rubber composition for rubber vibration insulator of [7],, wherein the diene rubber is natural rubber.

[9], The rubber composition for rubber vibration insulator of [1],, wherein the bismaleimide compound is selected from the group consisting of N,N'-m-phenylenebismaleimide and N,N'-(4,4'-diphenylmethane)bismaleimide.

[10], The rubber composition for rubber vibration insulator of [1],, wherein the composition further comprises carbon black selected from the group consisting of carbon black FEF and carbon black FT.

[11], The rubber composition for rubber vibration insulator of [1],, wherein the rubber component comprises high-cis-high-vinyl butadiene rubber containing 88, to 90% of cis-1,4, bonds and 8, to 10% of vinyl bonds.

[12], The rubber composition for rubber vibration insulator of [11],, wherein the rubber component further comprises at least one diene rubber is selected from the group consisting of natural rubber and isoprene rubber.

[13], The rubber composition for rubber vibration insulator of [12],, wherein the diene rubber is natural rubber.

[14], The rubber composition for rubber vibration insulator of [13],, wherein the high-cis-high-vinyl butadiene rubber is included in the proportion of from 10, to 50, parts by weight in 100, parts by weight of the rubber component.

[15], The rubber composition for rubber vibration insulator of [14],, wherein the diene rubber is included in the proportion of from 60, to 90, parts by weight, and the high-cis-high-vinyl butadiene rubber is included in the proportion of from 10, to 40, parts by weight in 100, parts by weight of the rubber component.

[16], The rubber composition for rubber vibration insulator of [15],, wherein the sulfur is included in the amount of from 0.4, to 1, part by weight, per 100, parts by weight of the rubber component.

[17], The rubber composition for rubber vibration insulator of [16],, wherein the bismaleimide compound is selected from the group consisting of N,N'-m-phenylenebismaleimide and N,N'-(4,4'-diphenylmethane)bismaleimide.

[18], The rubber composition for rubber vibration insulator of [17],, wherein the composition further comprises carbon black selected from the group consisting of carbon black FEF and carbon black FT.

[19], The rubber composition for rubber vibration insulator of [14],, wherein (i) the sulfur is included in the amount of from 0.4, to 1, part by weight, per 100, parts by weight of the rubber component, (ii) the bismaleimide compound is selected from the group consisting of N,N'-m-phenylenebismaleimide and N,N'-(4,4'-diphenylmethane)bismaleimide, and (iii) the composition further comprises carbon black selected from the group consisting of carbon black FEF and carbon black FT.

[20], A rubber vibration insulator, comprising the rubber composition according to [1].

ADVANTAGEOUS EFFECTS OF INVENTION

The rubber composition for rubber vibration insulator as defined in the present invention gives rise to a rubber vibration insulator superior not only in heat resistance and low-temperature performance but also in fundamental properties and damping properties.

DESCRIPTION OF EMBODIMENTS

According to the present invention, the rubber composition for rubber vibration insulator is composed of rubber component comprising high-cis-high-vinyl butadiene rubber containing 85, to 93% of cis-1,4, bonds and 5, to 13% of vinyl bonds, sulfur, and a bismaleimide compound. The following is a detailed description of the constituents of the rubber composition.

In the present invention, the high-cis-high-vinyl butadiene rubber is butadiene rubber containing 85, to 93% of cis-1,4, bonds and 5, to 13% of vinyl bonds; it is characterized by its higher content of vinyl bonds than conventional high-cis butadiene rubbers (which usually contain about 0.5, to 2% of vinyl bonds). The content of cis-1,4, bonds should preferably be 88, to 90%, and the content of vinyl bonds should preferably be 8, to 10%. The high content of vinyl bonds in the butadiene prevents the polymer chains from coming close to each other, thereby hampering crystallization which is detrimental to low-temperature performance. In order that the rubber vibration insulator has satisfactory fundamental properties, the proportion of high-cis-high-vinyl butadiene rubber included, although not subject to any particular limitation, may be set to preferably less than 50, parts by weight, more preferably from 10, to 40, parts by weight, in 100, parts by weight of the rubber component. The high-cis-high-vinyl butadiene rubber varies in its effect; an excessively low content is detrimental to damping properties and low-temperature performance, and an excessively high content is detrimental to fundamental properties (such as tensile strength).

An example of the above-mentioned high-cis-high-vinyl butadiene rubber is "MBR" made by Ube Industries, Ltd.

In order that the rubber vibration insulator keeps its fundamental properties, the rubber composition should preferably be incorporated with another diene rubber in addition to the above-mentioned high-cis-high-vinyl butadiene rubber, although this is not mandatory. Typical examples of such additional diene rubber include natural rubber, isoprene rubber, styrene-butadiene rubber, chloroprene rubber, and acrylonitrile-butadiene rubber. They may be used alone or in combination with one another. Particularly suitable among them are natural rubber and isoprene rubber in the present invention.

The proportion of the above-mentioned additional diene rubber included, although not subject to any particular limitation, may be set to preferably at least 50, parts by weight, more preferably from 60, to 90, parts by weight, in 100, parts by weight of the rubber component. The diene rubber in an excessively small amount is detrimental to the fundamental properties such as tensile strength. On the other hand, the diene rubber in an excessively large amount is detrimental to low-temperature performance and damping properties.

Moreover, the rubber composition according to the present invention may also be incorporated with any conventional butadiene rubber (such as high-cis butadiene rubber and low-cis butadiene rubber) excluding the above-mentioned high-cis-high-vinyl butadiene rubber. The proportion of the conventional butadiene rubber may be set to less than 50, parts by weight in 100, parts by weight of the rubber component so long as the above-mentioned ratio is maintained for the high-cis-high-vinyl butadiene rubber and diene rubber. This restriction is imposed so that the rubber vibration insulator possesses the fundamental properties as required.

The above-mentioned butadiene rubber is not specifically restricted, and it may be properly selected from any known ones. Some typical examples are "BR01" (made by JSR Corporation) and "150L" (made by Ube Industries, Ltd.), which are high-cis butadiene rubber containing cis-1,4, bonds in an amount at least 95%.

Moreover, the rubber composition according to the present invention may also be incorporated, in addition to the above-mentioned rubbers, with any other known synthetic rubbers (and modified products thereof) in an amount not harmful thereto. Typical examples of such synthetic rubbers include isobutylene-isoprene rubber, silicone rubber, acrylic rubber, ethylene-propylene rubber, acrylate-butadiene rubber, urethane rubber, chlorosulfonated rubber, chlorinated polyethylene, epichlorohydrin, and fluororubber, which may have modified molecular chain terminals. They may be used alone or in combination with another.

The rubber composition according to the present invention should preferably be one in which the sulfur content is low so that it gives rise to the rubber vibration insulator possessing good heat resistance. A typical amount of sulfur is up to 1, part by weight (or from 0, to 1, part by weight), preferably from 0.4, to 1, part by weight, per 100, parts by weight of the rubber component. Sulfur added in an amount exceeding 1, part by weight is detrimental to heat resistance. On the other hand, the rubber composition without sulfur will be poor in low-temperature performance and damping properties.

The bismaleimde compound mentioned above may be selected from any known ones, without specific restrictions. A preferable one is represented by the formula below.

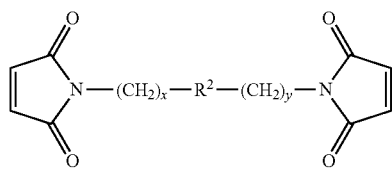

In the formula above, x and y independently denote an integer of 0, to 20,, preferably 0, to 10;, and $R^2$, denotes an aromatic group which carbon number is 5, to 18, or aromatic group which carbon number is 7, to 24, containing alkyl groups. Typical examples of the aromatic group are represented by the structural formulas below, in which the aromatic group is depicted as if it does not have two bonding hands but, in actual, it is a divalent group having two bonding hands extending from arbitrary two carbon atoms thereof.

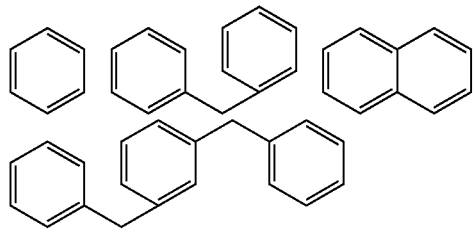

Typical examples of the bismaleimde compound represented by the structural formulas above include N,N'-o-phenylenebismaleimide, N,N'-m-phenylenebismaleimide, N,N'-p-phenylenebismaleimide, N,N'-(4,4'-diphenylmethane) bismaleimide, 2,2'-bis-[4-(4-maleimidephenoxy)phenyl] propane, and bis(3-ethyl-5-methyl-4-maleimidephenyl) methane. Preferable among these examples are N,N'-m-phenylenebismaleimide and N,N'-(4,4'-diphenylmethane) bismaleimide.

Incidentally, the foregoing bismaleimde compounds may be used alone or in combination with one another. The amount of bismaleimde compound included, although not subject to any particular limitation, may be set to preferably from 1, to 5, parts by weight, more preferably from 1, to 4, parts by weight, per on 100, parts by weight of the rubber component. The bismaleimide compound in an excessively small amount is detrimental to the damping properties and low-temperature performance. On the other hand, the bismaleimide compound in an excessively large amount is detrimental to the fundamental properties such as tensile elongation and tensile strength.

The rubber composition according to the present invention may be incorporated, when necessary, with such additives as vulcanization accelerator, zinc oxide, fatty acid, filler, oil, wax, and age resister. Each of these additives will be described in more detail in the following.

Examples of the vulcanization accelerator include those of sulfenamide type, such as CBS (N-cyclohexyl-2-benzothiazyl-sulfenamide), TBBS (N-t-butyl-2-benzothiazylsulfenamide), and TBS1, (N-t-butyl-2-benzothiazylsulfenamide); those of guanidine type, such as DPG (diphenylguanidine); those of thiurum type, such as TMTD (tetramethyldisulfide), TETD (tetraethylthiuram disulfide), TBTD (tetrabutylthiuram disulfide), and tetrabenzylthiuram disulfide; and zinc dialkyldithiophosphate. They may be used alone or in combination with one another. The amount of vulcanization accelerator included, although not subject to any particular limitation, may be set to preferably from 0.1, to 3, parts by weight, more preferably from 0.5, to 2.5, parts by weight, per 100, parts by weight of the rubber component.

For speedy vulcanization, the vulcanization accelerator may be used in combination with an accelerator activator, such as zinc oxide and fatty acid. The fatty acid may be saturated or unsaturated ones or straight chain or branched chain ones. They are not specifically restricted in carbon number. The carbon number may range from 1, to 30,, preferably from 15, to 30. Typical examples of the fatty acid include naphthenic acid such as cyclohexane acid (cyclohexanecarboxylic acid) and alkylcyclopentanecarboxylic acid which has a side chain; saturated fatty acid such as hexanoic acid, octanoic acid, decanoic acid (including branched carboxylic acid such as neodecanoic acid), dodecanoic acid, tetradecanoic acid, hexadecanoic acid, and octadecanoic acid (stearic acid); unsaturated fatty acid such as methacrylic acid, oleic acid, linoleic acid, and linolenic acid; and resin acid such as rosin, tall oil fatty acid, and abietic acid. They may be used alone or in combination with one another. Preferable among the foregoing examples are zinc oxide and stearic acid. The amount of accelerator activator included, although not subject to any particular limitation, may be set to preferably from 1, to 10, parts by weight, more preferably from 2, to 7, parts by weight, per 100, parts by weight of the rubber component. An excessively large amount will be detrimental to workability and dynamic-to-static modulus ratio. An excessively small amount will lead to slow vulcanization.

Examples of the filler include inorganic ones such as carbon black, silica, fine particles of magnesium silicate, heavy calcium carbonate, magnesium carbonate, clay, and talc and organic ones such as high-styrene resin, coumarone-indene resin, phenolic resin, lignin, modified melamine resin, and petroleum resin. They may be used alone or in combination with one another. Preferable among the foregoing examples are carbon black and silica, with the former being more preferable.

The carbon black is not specifically restricted in its type. Any one of standard types is acceptable, such as SRF, GPF, FEF, HAF, ISAF, SAF, FT, and MT. Preferable among these examples are FEF and FT. They may be used alone or in combination with one another. Incidentally, the above-mentioned carbon black should preferably be one which has an iodine adsorption value of 10, to 70, mg/g and a DBP absorption value of 30, to 180, ml/100, g. The carbon black meeting this requirement is desirable because the resulting rubber composition gives rise to a rubber vibration insulator superior not only in heat resistance and low-temperature performance but also in fundamental properties and damping properties (low dynamic-to-static modulus ratio).

The amount of carbon black included, although not subject to any particular limitation, may be set to preferably from 20, to 80, parts by weight, more preferably from 20, to 60, parts by weight, per 100, parts by weight of the rubber component.

Examples of the silica include any known wet silica (hydrated silicic acid), dry silica (anhydrous silicic acid), and colloidal silica, with the first one being most desirable. Preferred wet silica is one which has a BET specific surface area of 70, to 230, m$^2$/g, particularly 80, to 200, m$^2$/g. The amount of the silica included, although not subject to any particular limitation, may be set to preferably from 10, to 80, parts by weight, more preferably from 15, to 60, parts by weight, per 100, parts by weight of the rubber component.

The silica to be used as a filler should preferably be treated with a silane coupling agent for improvement in dispersibility and reinforcing effect. Examples of the silane coupling agent include vinyltriethoxysilane, vinyltris(β-methoxyethoxy)silane, γ-methacryloxypropyltrimethoxysilane, vinyltriacetoxysilane, γ-glycidoxypropyltrimethoxysilane, γ-glycidoxypropyltriethoxysilane, β-(3,4-epoxycyclohexyl) ethyltrimethoxysilane, γ-chloropropylmethoxysilane, vinyltrichlorosilane, γ-mercaptopropyltrimethoxysilane, γ-aminopropyltriethoxysilane, N-β-(aminoethyl)-γ-aminopropyltrimethoxysilane, bis-triethoxysilylpropyltetrasulfide, and bis-triethoxysilylpropyldisulfide. They may be used alone or in combination with one another. The amount of the silane coupling agent included, although not subject to any particular limitation, may be set to preferably from 1, to 10% by weight, more preferably from 5, to 10% by weight, based on the amount of the silica. The silane coupling agent in an excessively small amount does not fully produce its effect of improving dispersibility and reinforcing effect. An excessively large amount is wasted without desired effects corresponding to it.

The oil may be selected from any known ones without specific restrictions. It includes, for example, process oil such as aromatic oil, naphthenic oil, and paraffin oil, vegetable oil such as coconut oil, synthetic oil such as alkylbenzene oil, and castor oil. Naphthenic oil is most desirable in this invention. They may be used alone or in combination with one another. The amount of the oil included, although not subject to any particular limitation, may be set to preferably from 2, to 80, parts by weight, per 100, parts by weight of the rubber component. Any amount outside the foregoing range is detrimental to kneading action. In the case where an oil-extended rubber is added to the rubber component, the foregoing range should adjust it so that the sum of the amount of oil contained in the oil-extended rubber and the amount of oil to be added separately.

The wax may be selected from any known ones, such as paraffin wax and microcrystalline wax, and amide compounds, such as stearamide, oleamide, and erucamide. They are exemplified and may be used alone or in combination with one another. Paraffin wax and microcrystalline wax are preferable in the present invention. The wax improves workability by these combinations. The amount of the wax included, although not subject to any particular limitation, may be set to preferably from 1, to 10, parts by weight, per 100, parts by weight of the rubber component.

The age resistor may be selected from any known ones without specific restrictions. It includes, for example, those of phenol type, imidazole type, and amine type. They may be used alone or in combination with one another. The amount of the age resistor may be set to preferably from 1, to 10, parts by weight, more preferably from 1, to 7, parts by weight, per 100, parts by weight of the rubber component.

The rubber composition of the present invention may be incorporated, according to need, with commonly used additives, such as antioxidant, plasticizer, tackifier, petroleum resin, ultraviolet absorber, dispersing agent, compatibilizer, homogenizing agent, and vulcanization retarder, in addition to the above-mentioned ingredients.

The rubber composition of the present invention may be produced by compounding the above-mentioned components in any manner without specific restrictions. For example, it is possible to mix them all at once or mix them in two or three stages. The kneading may be accomplished by using any known kneading machine, such as roll, internal mixer, and Banbury rotor. Moreover, forming into sheet and belt may be accomplished by using any known molding machines such as extruder and press.

The rubber composition of the present invention may be vulcanized under any conditions without specific restrictions. Usually, it is vulcanized at 140, to 180° C. for 5, to 120, minutes.

The rubber composition of the present invention may be made into a variety of rubber vibration insulators which need high heat resistance and good low-temperature performance, particularly automotive torsional damper, engine mount, and muffler hanger, which are exposed to high temperatures. It will find use in any other applications than mentioned above.

EXAMPLES

The invention will be described in more detail with reference to the following Examples and Comparative Examples, which are not intended to restrict the scope thereof.

Examples 1, to 10, and Comparative Examples 1, to 7

These Examples are intended to see how the rubber composition for rubber vibration insulators varies in performance depending on the type and recipe of rubbers and the effect of sulfur and bismaleimide compound. Samples of the rubber composition, in Examples 1, to 10, and Comparative Examples 1, to 7,, were prepared by kneading from the components shown in Table 1, below. The resulting rubber compositions were vulcanized under prescribed conditions, and the cured products were tested for hardness (Hd), tensile elongation (Eb), tensile strength (Tb), heat resistance, static spring constant (Ks), dynamic-to-static modulus ratio (Kd/Ks), and low-temperature performance, according to the JIS (Japanese Industrial Standards) listed below. Incidentally, the tests for hardness (Hd), tensile elongation (Eb), tensile strength (Tb), and heat resistance were performed on specimens conforming to the JIS standard which were cut out of a sheet measuring 120, mm long, 120, mm wide, and 2, mm thick. Also, the test for static spring constant (Ks) and dynamic-to-static modulus ratio (Kd/Ks) was performed on a cylindrical specimen measuring 30, mm high and 30, mm in diameter. The results of the tests are shown in Table 1, (Examples) and Table 2, (Comparative Examples).

[Hardness (Hd)]
Measured according to JIS K6253, (Type A).

[Tensile Elongation (Eb)]
Measured according to JIS K6251.

[Tensile Strength (Tb)]
Measured according to JIS K6251.

[Heat Resistance (heat aging test)]
Measured according to JIS K6257. A specimen was aged at 100° C. for 500, hours under heat aging conditions and then tested for hardness (Hd), tensile elongation (Eb), and tensile strength (Tb). Retention was calculated from comparison between measurements before and after heat aging.

[Dynamic Spring Constant (Kd) and Dynamic-to-Static Modulus Ratio (Kd/Ks)]
Measured by using a cylindrical specimen according to JIS K6385, at 100, Hz. The lower the dynamic-to-static modulus ratio (Kd/Ks) is, the better the specimen is in damping properties.

[Low-Temperature Performance]
First, the cylindrical specimen was tested for Kd (initial) according to JIS K6385, at 43, Hz. Next, the same specimen as above was allowed to stand in a thermostat at −35° C. for 15, days and then tested again for Kd (after exposure to a low temperature: final) under the same conditions as above. The results of measurements thus obtained were compared to determine the low-temperature performance which is rated as follows.

Good: Kd (final)/Kd (initial)≤10

NG: Kd (final)/Kd (initial)>10

TABLE 1

| | | Example | | | | | | | | | |
|---|---|---|---|---|---|---|---|---|---|---|---|
| | | 1 | 2 | 3 | 4 | 5 | 6 | 7 | 8 | 9 | 10 |
| Formulation (parts by weight) | NR | 80.0 | 90.0 | 60.0 | 80.0 | 80.0 | 80.0 | 80.0 | 80.0 | 80.0 | 50.0 |
| | High-cis-high-vinyl butadiene rubber | 20.0 | 10.0 | 40.0 | 20.0 | 20.0 | 20.0 | 20.0 | 20.0 | 20.0 | 50.0 |
| | Low-cis butadiene rubber | | | | | | | | | | |
| | High-cis butadiene rubber | | | | | | | | | | |
| | SBR | | | | | | | | | | |
| | Carbon black FT | 30.0 | 30.0 | 30.0 | 30.0 | 30.0 | 30.0 | 30.0 | 30.0 | 30.0 | 30.0 |
| | Stearic acid | 1.0 | 1.0 | 1.0 | 1.0 | 1.0 | 1.0 | 1.0 | 1.0 | 1.0 | 1.0 |
| | Zinc oxide | 3.0 | 3.0 | 3.0 | 3.0 | 3.0 | 3.0 | 3.0 | 3.0 | 3.0 | 3.0 |
| | Wax | 2.0 | 2.0 | 2.0 | 2.0 | 2.0 | 2.0 | 2.0 | 2.0 | 2.0 | 2.0 |
| | Age resistor RD | 1.0 | 1.0 | 1.0 | 1.0 | 1.0 | 1.0 | 1.0 | 1.0 | 1.0 | 1.0 |
| | Age resistor 6C | 1.0 | 1.0 | 1.0 | 1.0 | 1.0 | 1.0 | 1.0 | 1.0 | 1.0 | 1.0 |
| | Naphthenic oil | 5.0 | 5.0 | 5.0 | 5.0 | 5.0 | 5.0 | 5.0 | 5.0 | 5.0 | 5.0 |
| | Sulfur | 0.7 | 0.7 | 0.7 | 0.4 | 1.0 | 0.7 | 0.7 | 0.7 | 0.7 | 0.7 |
| | Bismaleimide 1 | 3.0 | 3.0 | 3.0 | 3.0 | 3.0 | | 1.0 | 5.0 | 6.0 | 3.0 |
| | Bismaleimide 2 | | | | | | 3.0 | | | | |
| | Vulcanization accelerator CZ | 2.0 | 2.0 | 2.0 | 2.0 | 2.0 | 2.0 | 2.0 | 2.0 | 2.0 | 2.0 |
| Physical properties | Hardness Hd | 48 | 47 | 50 | 47 | 53 | 48 | 46 | 50 | 52 | 51 |
| | Tensile elongation Eb (%) | 640 | 680 | 560 | 630 | 600 | 650 | 680 | 610 | 550 | 530 |
| | Tensile strength Tb (MPa) | 18 | 21 | 15 | 18 | 21 | 19 | 19 | 17 | 14 | 13 |
| | After heat aging Hd | 50 | 50 | 50 | 49 | 57 | 51 | 49 | 52 | 54 | 50 |
| | Retention (%) of after heat aging Eb | 85 | 81 | 84 | 88 | 77 | 83 | 83 | 86 | 83 | 79 |
| | Retention (%) of after heat aging Tb | 70 | 66 | 76 | 79 | 64 | 67 | 68 | 71 | 72 | 84 |
| | Dynamic-to-static modulus ratio Kd100/Ks | 1.21 | 1.20 | 1.19 | 1.22 | 1.15 | 1.22 | 1.25 | 1.20 | 1.21 | 1.15 |
| | Low-temperature performance | Good | Good | Good | Good | Good | Good | Good | Good | Good | Good |

TABLE 2

| | | Comparative Example | | | | | | |
|---|---|---|---|---|---|---|---|---|
| | | 1 | 2 | 3 | 4 | 5 | 6 | 7 |
| Formulation (parts by weight) | NR | 100.0 | 80.0 | 80.0 | 80.0 | 80.0 | 80.0 | 80.0 |
| | High-cis-high-vinyl butadiene rubber | | | | | 20.0 | 20.0 | 20.0 |
| | Low-cis butadiene rubber | | 20.0 | | | | | |
| | High-cis butadiene | | | 20.0 | | | | |

TABLE 2-continued

| | | Comparative Example | | | | | | |
|---|---|---|---|---|---|---|---|---|
| | | 1 | 2 | 3 | 4 | 5 | 6 | 7 |
| | rubber | | | | | | | |
| | SBR | | | | 20.0 | | | |
| | Carbon black FT | 30.0 | 30.0 | 30.0 | 30.0 | 30.0 | 30.0 | 30.0 |
| | Stearic acid | 1.0 | 1.0 | 1.0 | 1.0 | 1.0 | 1.0 | 1.0 |
| | Zinc oxide | 3.0 | 3.0 | 3.0 | 3.0 | 3.0 | 3.0 | 3.0 |
| | Wax | 2.0 | 2.0 | 2.0 | 2.0 | 2.0 | 2.0 | 2.0 |
| | Age resistor RD | 1.0 | 1.0 | 1.0 | 1.0 | 1.0 | 1.0 | 1.0 |
| | Age resistor 6C | 1.0 | 1.0 | 1.0 | 1.0 | 1.0 | 1.0 | 1.0 |
| | Naphthenic oil | 5.0 | 5.0 | 5.0 | 5.0 | 5.0 | 5.0 | 5.0 |
| | Sulfur | 0.7 | 0.7 | 0.7 | 0.7 | | 1.2 | 0.7 |
| | Bismaleimide 1 | 3.0 | 3.0 | 3.0 | 3.0 | 3.0 | 3.0 | |
| | Bismaleimide 2 | | | | | | | |
| | Vulcanization accelerator CZ | 2.0 | 2.0 | 2.0 | 2.0 | 2.0 | 2.0 | 2.0 |
| Physical properties | Hardness Hd | 49 | 47 | 47 | 50 | 42 | 56 | 45 |
| | Tensile elongation Eb (%) | 690 | 680 | 610 | 670 | 720 | 570 | 700 |
| | Tensile strength Tb (MPa) | 22 | 20 | 16 | 20 | 17 | 22 | 20 |
| | After heat aging Hd | 52 | 45 | 49 | 52 | 43 | 62 | 49 |
| | Retention (%) of after heat aging Eb | 79 | 87 | 83 | 77 | 91 | 68 | 77 |
| | Retention (%) of after heat aging Tb | 61 | 74 | 70 | 58 | 84 | 56 | 63 |
| | Dynamic-to-static modulus ratio Kd100/Ks | 1.32 | 1.30 | 1.24 | 1.39 | 1.39 | 1.15 | 1.32 |
| | Low-temperature performance | NG | Good | NG | Good | NG | Good | NG |

Details on the components in Tables 1, and 2, are given below.

NR: "RSS#4"

High-cis-high-vinyl butadiene rubber: "MBR" (made by Ube Industries, Ltd.), with the content of cis-1,4, bonds and vinyl bonds being 88, to 90% and 8, to 10%, respectively Low-cis butadiene rubber: "NF35R" (made by Asahikasei Chemicals Corporation), with the content of cis-1,4, bonds and vinyl bonds being 35% and 13%, respectively High-cis butadiene rubber: "BR01" (made by JSR Corporation), with the content of cis-1,4, bonds and vinyl bonds being 96% and 2%, respectively SBR: "SBR 1500" (made by JSR Corporation)

Carbon black FT: "Asahi Thermal", carbon black of FT class (made by Asahi Carbon Co., Ltd.), having an iodine adsorption value of 27, mg/g and a DBP absorption value of 28, ml/100, g Stearic acid: "Stearic acid 50S" (made by New Japan Chemical Co., Ltd.)

Zinc oxide: "Zinc oxide No. 3" (made by Hakusui Tech Co., Ltd.)

Wax: "Suntight S" (made by Seiko Chemical Corporation)

Age resistor RD: "Nocrac 224", 2,2,4-trimethyl-1,2-dihydroquinoline polymer (made by Ouchi Shinko Chemical Industrial Co., Ltd.)

Age resistor 6C: "Nocrac 6C", N-phenyl-N'-(1,3-dimethyl-butyl)-p-phenylenediamine (made by Ouchi Shinko Chemical Industrial Co., Ltd.)

Naphthenic oil: "Sunthene 4240" (made by Sun Refining and Marketing Company)

Sulfur: "Powder sulfur" (made by Tsurumi Chemical Industry Co., Ltd.)

Bismaleimide 1:, "Vulnoc PM", N,N'-m-phenylenebismaleimide (made by Ouchi Shinko Chemical Industrial Co., Ltd.)

Bismaleimide 2:, "BMI-RB", N,N'-(4,4'-diphenylmethane)-bismaleimide (made by Daiwakasei Industry Co., Ltd.)

Vulcanization accelerator CZ: "Noccelar CZ-G" (made by Ouchi Shinko Chemical Industrial Co., Ltd.)

It is noted from Tables 1, and 2, that the rubber composition containing high-cis-high vinyl butadiene rubber as the rubber component and sulfur and bismaleimide as additives in a specific amount gives rise to rubber vibration insulators superior not only in heat resistance and low-temperature performance but also in fundamental properties and damping properties.

Examples 1, 11,, and 12, and Comparative Examples 1, 8,, and 9

These Examples are intended to see how the rubber composition for rubber vibration insulators varies in performance depending on the type of carbon black. Samples of the rubber composition, in Examples 1, 11,, and 12, and Comparative Examples 1, 8,, and 9,, were prepared by kneading from the components shown in Table 3, below. The resulting rubber compositions were vulcanized and tested for hardness (Hd), tensile elongation (Eb), tensile strength (Tb), heat resistance, static spring constant (Ks), dynamic-to-static modulus ratio (Kd/Ks), and low-temperature performance, in the same way as mentioned above. The results of the test are also shown in Table 3.

TABLE 3

|  |  | Example | | | Comparative Example | | |
|---|---|---|---|---|---|---|---|
|  |  | 1 | 11 | 12 | 1 | 8 | 9 |
| Formulation (parts by weight) | NR | 80.0 | 80.0 | 80.0 | 100.0 | 100.0 | 100.0 |
|  | High-cis-high-vinyl butadiene rubber | 20.0 | 20.0 | 20.0 |  |  |  |
|  | Carbon black FT | 30.0 |  |  | 30.0 |  |  |
|  | Carbon black FEF |  | 30.0 |  |  | 30.0 |  |
|  | Carbon black HAF |  |  | 30.0 |  |  | 30.0 |
|  | Stearic acid | 1.0 | 1.0 | 1.0 | 1.0 | 1.0 | 1.0 |
|  | Zinc oxide | 3.0 | 3.0 | 3.0 | 3.0 | 3.0 | 3.0 |
|  | Wax | 2.0 | 2.0 | 2.0 | 2.0 | 2.0 | 2.0 |
|  | Age resistor RD | 1.0 | 1.0 | 1.0 | 1.0 | 1.0 | 1.0 |
|  | Age resistor 6C | 1.0 | 1.0 | 1.0 | 1.0 | 1.0 | 1.0 |
|  | Naphthenic oil | 5.0 | 5.0 | 5.0 | 5.0 | 5.0 | 5.0 |
|  | Sulfur | 0.7 | 0.7 | 0.7 | 0.7 | 0.7 | 0.7 |
|  | Bismaleimide 1 | 3.0 | 3.0 | 3.0 | 3.0 | 3.0 | 3.0 |
|  | Vulcanization accelerator CZ | 2.0 | 2.0 | 2.0 | 2.0 | 2.0 | 2.0 |
| Physical Properties | Hardness Hd | 48 | 48 | 51 | 49 | 47 | 50 |
|  | Tensile elongation Eb (%) | 640 | 670 | 650 | 690 | 690 | 680 |
|  | Tensile strength Tb (MPa) | 18 | 18 | 20 | 22 | 22 | 23 |
|  | After heat aging Hd | 50 | 51 | 54 | 52 | 49 | 53 |
|  | Retention (%) of after heat aging Eb | 85 | 87 | 82 | 79 | 80 | 78 |
|  | Retention (%) of after heat aging Tb | 70 | 75 | 68 | 61 | 63 | 61 |
|  | Dynamic-to-static modulus ratio Kd100/Ks | 1.21 | 1.24 | 1.52 | 1.32 | 1.39 | 1.68 |
|  | Low-temperature performance | Good | Good | Good | NG | NG | NG |

Details on the components in Table 3, are given below.
NR: "RSS#4" High-cis-high-vinyl butadiene rubber: "MBR" (made by Ube Industries, Ltd.), with the content of cis-1,4, bonds and vinyl bonds being 88, to 90% and 8, to 10%, respectively
Carbon black FT: "Asahi Thermal", carbon black of FT class (made by Asahi Carbon Co., Ltd.), having an iodine adsorption value of 27, mg/g and a DBP absorption value of 28, ml/100, g
Carbon black FEF: "Asahi #65", carbon black of FEF class (made by Asahi Carbon Co., Ltd.), having an iodine adsorption value of 43, mg/g and a DBP absorption value of 121, ml/100, g
Carbon black HAF: "Asahi #70", carbon black of HAF class (made by Asahi Carbon Co., Ltd.), having an iodine adsorption value of 82, mg/g and a DBP absorption value of 102, ml/100, g
Stearic acid: "Stearic acid 50S" (made by New Japan Chemical Co., Ltd.)
Zinc oxide: "Zinc oxide No. 3" (made by Hakusui Tech Co., Ltd.)
Wax: "Suntight S" (made by Seiko Chemical Corporation)
Age resistor RD: "Nocrac 224", 2,2,4-trimethyl-1,2-dihydroquinoline polymer (made by Ouchi Shinko Chemical Industrial Co., Ltd.)
Age resistor 6C: "Nocrac 6C", N-phenyl-N'-(1,3-dimethylbutyl)-p-phenylenediamine (made by Ouchi Shinko Chemical Industrial Co., Ltd.)
Naphthenic oil: "Sunthene 4240" (made by Sun Refining and Marketing Company)
Sulfur: "Powder sulfur" (made by Tsurumi Chemical Industry Co., Ltd.)
Bismaleimide 1:, "Vulnoc PM", N,N'-m-phenylenebismaleimide (made by Ouchi Shinko Chemical Industrial Co., Ltd.)
Vulcanization accelerator CZ: "Noccelar CZ-G" (made by Ouchi Shinko Chemical Industrial Co., Ltd.)

It is noted from Table 3, that the rubber composition containing high-cis-high vinyl butadiene rubber as the rubber component and sulfur and bismaleimide as additives in a specific amount gives rise to rubber vibration insulators superior not only in heat resistance and low-temperature performance but also in fundamental properties and damping properties, without being affected by the kind of carbon black.

Japanese Patent Application No. 2013-120537, is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A rubber composition for rubber vibration insulator comprising:
 a rubber component comprising high-cis-high-vinyl butadiene rubber containing 85 to 93% of cis-1,4 bonds and 5 to 13% of vinyl bonds,
 sulfur, and
 a bismaleimide compound,
 wherein the high-cis-high-vinyl butadiene rubber is included in an amount of from 10 to 50 parts by weight per 100 parts by weight of the rubber component, the sulfur is included in an amount of from 0.4 to 1 part by weight, per 100 parts by weight of the rubber component.

2. The rubber composition for rubber vibration insulator of claim 1, wherein the rubber component further comprises one or more species of diene rubber selected from the group consisting of natural rubber, isoprene rubber, styrene-butadiene rubber, chloroprene rubber, and acrylonitrile-butadiene rubber.

3. The rubber composition for rubber vibration insulator of claim 2, wherein the diene rubber is included in a proportion of at least 50 parts by weight in 100 parts by weight of the rubber component.

4. The rubber composition for rubber vibration insulator of claim 3, wherein the diene rubber is included in the proportion of from 60 to 90 parts by weight, and the high-cis-high-vinyl butadiene rubber is included in the proportion of from 10 to 40 parts by weight in 100 parts by weight of the rubber component.

5. The rubber composition for rubber vibration insulator of claim 1, wherein the bismaleimide is included in the amount of from 1 to 5 parts by weight, per 100 parts by weight of the rubber component.

6. The rubber composition for rubber vibration insulator of claim 2, wherein the diene rubber is selected from the group consisting of natural rubber and isoprene rubber.

7. The rubber composition for rubber vibration insulator of claim 6, wherein the diene rubber is natural rubber.

8. The rubber composition for rubber vibration insulator of claim 1, wherein the bismaleimide compound is selected from the group consisting of N,N'-m-henylenebismaleimide and N,N'-(4,4'-diphenylmethane)bismaleimide.

9. The rubber composition for rubber vibration insulator of claim 1, wherein the composition further comprises carbon black selected from the group consisting of carbon black FEF and carbon black FT.

10. The rubber composition for rubber vibration insulator of claim 1, wherein the rubber component comprises high-cis-high-vinyl butadiene rubber containing 88 to 90% of cis-1,4 bonds and 8 to 10% of vinyl bonds.

11. The rubber composition for rubber vibration insulator of claim 10, wherein the rubber component further comprises at least one diene rubber is selected from the group consisting of natural rubber and isoprene rubber.

12. The rubber composition for rubber vibration insulator of claim 11, wherein the diene rubber is natural rubber.

13. The rubber composition for rubber vibration insulator of claim 12, wherein the high-cis-high-vinyl butadiene rubber is included in the proportion of from 10 to 50 parts by weight in 100 parts by weight of the rubber component.

14. The rubber composition for rubber vibration insulator of claim 13, wherein the diene rubber is included in the proportion of from 60 to 90 parts by weight, and the high-cis-high-vinyl butadiene rubber is included in the proportion of from 10 to 40 parts by weight in 100 parts by weight of the rubber component.

15. The rubber composition for rubber vibration insulator of claim claim 14, wherein the bismaleimide compound is selected from the group consisting of N,N'-m-phenylenebismaleimide and N,N'-(4,4'-diphenylmethane) bismaleimide.

16. The rubber composition for rubber vibration insulator of claim 15, wherein the composition further comprises carbon black selected from the group consisting of carbon black FEF and carbon black FT.

17. The rubber composition for rubber vibration insulator of claim 13, wherein (i) the sulfur is included in the amount of from 0.4 to 1 part by weight, per 100 parts by weight of the rubber component, (ii) the bismaleimide compound is selected from the group consisting of N,N'-m-phenylenebismaleimide and N,N'-(4,4'-diphenylmethane)bismaleimide, and (iii) the composition further comprises carbon black selected from the group consisting of carbon black FEF and carbon black FT.

18. A rubber vibration insulator, comprising the rubber composition according to claim 1.

* * * * *